United States Patent
Tougher

(10) Patent No.: US 11,908,439 B2
(45) Date of Patent: Feb. 20, 2024

(54) PROGRAMMABLE CYLINDRIC KEYS BY DETACHABLY STACKABLE RINGS FOR MUSIC TOY

(71) Applicant: Spark and Rocket Ltd., Glasgow (GB)

(72) Inventor: Michael Tougher, Hamilton (GB)

(73) Assignee: Spark and Rocket Ltd., Glasgow (GB)

( * ) Notice: Subject to any disclaimer, the term of this patent is extended or adjusted under 35 U.S.C. 154(b) by 618 days.

(21) Appl. No.: 17/059,290

(22) PCT Filed: May 28, 2019

(86) PCT No.: PCT/GB2019/051447
§ 371 (c)(1),
(2) Date: Nov. 27, 2020

(87) PCT Pub. No.: WO2019/229422
PCT Pub. Date: Dec. 5, 2019

(65) Prior Publication Data
US 2021/0225341 A1 Jul. 22, 2021

(30) Foreign Application Priority Data

May 28, 2018 (GB) .................................... 1808694

(51) Int. Cl.
*G10H 1/18* (2006.01)
*A63H 5/00* (2006.01)
*G10H 1/00* (2006.01)

(52) U.S. Cl.
CPC ............... *G10H 1/188* (2013.01); *A63H 5/00* (2013.01); *G10H 1/0083* (2013.01); *G10H 2230/055* (2013.01)

(58) Field of Classification Search
CPC .................. G10H 1/188; G10H 1/0083; G10H 2230/055; G10H 1/344; G10H 2220/285;
(Continued)

(56) References Cited

U.S. PATENT DOCUMENTS 4,287,568 A * 9/1981 Lester ................... G10H 1/0041
984/304
5,349,129 A * 9/1994 Wisniewski ............. G10H 1/32
84/718

(Continued)

FOREIGN PATENT DOCUMENTS

WO 2018015743 1/2018
WO WO-2018015743 A1 * 1/2018
WO PCT/GB2019/51447 9/2019

OTHER PUBLICATIONS

UK Intellectual Property Office, examination report in GB1907459.0, dated Jan. 10, 2022.

*Primary Examiner* — Jeffrey Donels
(74) *Attorney, Agent, or Firm* — Dorton & Willis LLP; Ryan Willis

(57) ABSTRACT

Signalling apparatus for a sound system, the signalling apparatus being configured for communicating with a processor, the signalling apparatus comprising: an identifier comprising a unique parameter value for identifying a sound property associated with the signalling apparatus; and an electrical contact configured to electrically connect with an electrical contact associated with the processor to communicate the parameter value with the processor, wherein the signalling apparatus is configured such that the electrical contact of the signalling apparatus is substantially fixed with respect to the electrical contact associated with the processor during activation of the sound system and/or signalling apparatus.

15 Claims, 7 Drawing Sheets

(58) Field of Classification Search
CPC .......... G10H 1/0558; G10H 1/34; A63H 5/00; G06F 3/02
See application file for complete search history.

(56) References Cited

U.S. PATENT DOCUMENTS

| | | | | |
|---|---|---|---|---|
| 5,451,178 | A * | 9/1995 | Yorozu | G09B 5/04 446/175 |
| 5,824,931 | A * | 10/1998 | Papadopoulos | G10G 1/02 84/474 |
| 5,949,010 | A * | 9/1999 | Hacker | G09B 15/003 84/476 |
| 6,132,281 | A * | 10/2000 | Klitsner | A63H 33/042 446/408 |
| 6,353,168 | B1 * | 3/2002 | Sosoka, Jr. | G10H 1/0008 446/408 |
| 6,991,509 | B1 * | 1/2006 | Carley | A63H 33/006 434/335 |
| 8,420,923 | B1 * | 4/2013 | Choi | G10H 1/18 84/476 |
| 2001/0003942 | A1 * | 6/2001 | Yabushita | G10H 1/26 84/609 |
| 2002/0033801 | A1 * | 3/2002 | Weil | G06F 3/002 345/156 |

* cited by examiner

PROGRAMMABLE CYLINDRIC KEYS BY DETACHABLY STACKABLE RINGS FOR MUSIC TOY

This application is a national stage of PCT/GB2019/051447, filed May 28, 2019, which claimed priority to Great Britain patent application number 1808694.2, filed May 28, 2018, all of which are incorporated herein by reference.

FIELD OF THE INVENTION

The present disclosure relates to a signalling apparatus and associated methods which, for example, relate to (but not exclusively) e.g. generating a sound.

BACKGROUND TO THE INVENTION

There are multiple methods for generating a sound. Such methods range from relatively straight forward percussion instruments such as drums which may be regarded as relatively easy to play. Children, for example, may find it relatively simple to play the percussion instrument and maintain a beat or rhythm. However, some percussion instruments (e.g. unpitched percussion instruments such as some drums) have limited or no scope for playing different notes (e.g. sounds of different frequencies or "pitch").

There are multiple types of musical instruments capable of producing a sound corresponding to different notes or pitch, including for example, pitched percussion instruments such as xylophones or glockenspiels, stringed instruments such as violins or guitars, wind instruments such as recorders or flutes, brass instruments such as trumpets or trombones, keyboard instruments such as pianos or organs, and the like. However, many of these instruments are sometimes regarded as relatively difficult to play and learn. The learning process for a musical instrument can be relatively frustrating, time-consuming and expensive. It can take years of practice before a person, whether an adult or child, can play a piece of music to a high standard. Exacerbating some of the difficulties of the learning process is the need to learn musical notation, such as the notation used by classical musicians. Sometimes children and adults wishing to learn how to play a musical instrument can often give up before making any progress with the musical instrument.

STATEMENTS OF INVENTION

Various aspects of the present disclosure are defined in the independent claims. Some preferred features are defined in the dependent claims.

According to an example of the present disclosure, there is provided a signalling apparatus for a sound system, the signalling apparatus being configured for communicating with a processor. The signalling apparatus may comprise an identifier, which may comprise a unique parameter value for identifying a sound property associated with the signalling apparatus; and an electrical contact configured to electrically connect with an electrical contact associated with the processor to communicate the parameter value with the processor. The signalling apparatus may be selectively activatable to activate the sound system. The signalling apparatus may be configured such that the electrical contact of the signalling apparatus is substantially fixed with respect to the electrical contact associated with the processor during activation of the signalling apparatus.

The signalling apparatus may be part of and/or for use with a musical instrument, musical game and/or musical toy.

The sound system may comprise software for sending and/or receiving a signal to/from the signalling apparatus. The sound system may comprise hardware for sending and/or receiving a signal to/from the signalling apparatus. The sound system may be considered to be an audio, sonic or acoustic system.

The signalling apparatus may be configured such that at least one further signalling apparatus is stackable on the signalling apparatus, wherein the signalling apparatus and the further signalling apparatus are configured such that a plurality of electrical contacts of the plurality of signalling apparatus may be substantially fixed with respect to respective electrical contacts associated with the processor during activation of the signalling apparatus.

A communication path configured to communicate the parameter value from the signalling apparatus to the processor may be independent of a communication path configured to communicate the parameter value from a further signalling apparatus to the processor.

The signalling apparatus and further signalling apparatus may be configured such that only a limited number of signalling apparatus are stackable.

The electrical contacts of the plurality of signalling apparatus may be configured such that the electrical contacts are attachable to a support for supporting the signalling apparatus such that a limited number of signalling apparatus are stackable on the support.

The support and/or signalling apparatus may be configured to be pressed to activate the sound system. The support and/or signalling apparatus may be actuatable or otherwise operable, e.g. by a user. The support and/or signalling apparatus may be configured to press a button to activate the sound system, e.g. when the support and/or signalling apparatus is pressed or otherwise operated by a user. The signalling apparatus may be configured to be pressed to, in turn, press on the support (e.g. a support member) to activate the sound system.

The signalling apparatus and the further signalling apparatus may be configured such that electrical contacts of each of the signalling apparatus are connectable directly to the electrical contacts associated with the processor.

The signalling apparatus may be configured to be selectively activated to complete an electrical circuit associated with the processor in order to activate the sound system.

The signalling apparatus may comprise two electrical contacts for connecting to two respective electrical contacts associated with the processor. The signalling apparatus may comprise only two electrical contacts for connecting to two respective electrical contacts associated with the processor.

The signalling apparatus may comprise a first body part and a second body part. The signalling apparatus may comprise a first body part and a second body part, the first and second body part may be substantially the same.

The signalling apparatus may be configured such that the signalling apparatus may be attachable at a particular orientation.

The activation of the sound system may comprise one of: sending a signal to the processor, sending a signal corresponding to the parameter value, playing a sound corresponding to the parameter value. The activation of the sound system may comprise at least one of: sending a signal to the processor, sending a signal corresponding to the parameter value, playing a sound corresponding to the parameter value.

The signalling apparatus may comprise a sound property indicator element. The indicator element may be a visual indictor element. The indicator element may correspond to one or more sound properties. The indicator element may correspond to, or be associated with, a sound property associated with the signalling apparatus. The indicator element may be defined, at least in part, by the shape of at least a portion of the signalling apparatus.

The signalling apparatus and at least one of the further signalling apparatus may comprise an indicator element. The signalling apparatus and at least one of the further signalling apparatus may comprise a different indicator element.

The signalling apparatus and/or the further signalling apparatus may comprise one or more attachment members configured to attach the signalling apparatus to the at least one further signalling apparatus. The, or each, attachment member may be a magnetic element.

According to an example of the present disclosure, there is provided a support operable to provide communication between at least one signalling apparatus for a sound system and a processor configured for communicating with the signalling apparatus, the support for supporting the signalling apparatus comprising an identifier comprising a unique parameter value for identifying a sound property associated with the signalling apparatus. The support may comprise an electrical contact associated with the processor, the electrical contact configured to electrically connect with an electrical contact of the signalling apparatus to communicate the parameter value with the processor. The support may be configured such that the electrical contact of the signalling apparatus is substantially fixed with respect to the electrical contact associated with the processor during activation of the signalling apparatus to activate the sound system.

According to an example of the present disclosure, there is provided a support operable to provide communication between at least one signalling apparatus for a sound system and a processor configured for communicating with the signalling apparatus, the signalling apparatus comprising an identifier comprising a unique parameter value for identifying a sound property associated with the signalling apparatus. The support may comprise an electrical contact associated with the processor, the electrical contact configured to electrically connect with an electrical contact of the signalling apparatus to communicate the parameter value with the processor. The support may be configured such that the electrical contact of the signalling apparatus is substantially fixed with respect to the electrical contact associated with the processor during activation of the sound system and/or the signalling apparatus.

The support may comprise a support member, the support member may be configured such that the signalling apparatus is attachable to the support member such that the signalling apparatus is substantially fixed with respect to the support member.

The support member may be configured to move relative to the support to complete an electrical circuit associated with the processor in order to activate the sound system. The support member may be considered to be selectively activatable to activate the sound system.

The support member may be configured to move towards the support to complete an electrical circuit associated with the processor in order to activate the sound system. The support member may be configured to be pressed to activate the sound system. The support member may be configured to press a button to activate the sound system.

The support member may be configured to remain substantially fixed relative to the support during activation of the sound system.

The support may comprise input means operable to complete the electrical circuit associated with the processor in order to activate the sound system. The user input means may be a button, a push button, a switch, or the like. The user input means may be located at an upper region of the support. The user input means may be located on a top surface of the support.

The user input means may be configured to move relative to the support member during activation of the sound system. The user input means may be configured to move relative to the support member, and the support member may be configured to remain fixed relative to the support, during activation of the sound system.

The electrical contact associated with the processor may be located on a printed circuit board (PCB) connected to the support member.

The support may be configured such that the PCB is continuously electrically connected to the processor.

The support may be configured such that a plurality of electrical contacts of a plurality of signalling apparatus may be substantially fixed with respect to respective electrical contacts associated with the processor during activation of the signalling apparatus.

The support may be configured such that a communication path configured to communicate the parameter value from the signalling apparatus to the processor is independent of a communication path configured to communicate the parameter value from a further signalling apparatus to the processor, the further signalling apparatus being stacked on the signalling apparatus.

The support may be configured such that a limited number of signalling apparatus are stackable on the support.

The support may be configured such that the plurality of electrical contacts of the plurality of signalling apparatus are attachable to the support such that a limited number of signalling apparatus are stackable on the support.

The support may be configured such that electrical contacts of each of the signalling apparatus are connectable directly to the electrical contacts associated with the processor.

According to an example of the present disclosure, there is provided an assembly comprising: at least one signalling apparatus as described above and a support as described above.

The assembly may comprise a stand member configured to support a document, booklet, book, paper(s), or the like. The stand member may be a separate component to the assembly.

The assembly may comprise a case member configured to accommodate at least a part of the assembly.

According to an example of the present disclosure, there is provided a method of operating a processor for a sound system, the processor being configured for receiving a unique parameter value from at least one signalling apparatus, the parameter value identifying a sound property associated with the signalling apparatus. The method comprises connecting an electrical contact of the signalling apparatus with an electrical contact associated with the processor in a support, the electrical contacts configured to communicate the parameter value with the processor; activating the sound system by activating the signalling apparatus; keeping the electrical contact of the signalling apparatus and the electrical contact associated with the processor substantially fixed with respect to each other during activation of the sound system.

According to an example of the present disclosure, there is provided a computer program product that when executed by a processing system or control unit causes the processing system or control unit to at least partially implement the method as described above.

According to an example of the present disclosure, there is provided an assembly for a sound system comprising: at least two signalling apparatus being configured for communicating with a processor; a support for supporting the signalling apparatus and operable to provide communication between the signalling apparatus and the processor through support electrical contacts associated with the processor. The signalling apparatus each comprise: an identifier comprising a unique parameter value for identifying a sound property associated with the signalling apparatus and an electrical contact configured to electrically connect with corresponding support electrical contacts associated with the processor to communicate the parameter value with the processor. The assembly is configured such that the electrical contacts of each of the signalling apparatus are connectable directly to the corresponding support electrical contacts associated with the processor. The support and/or the at least two signalling apparatus may be selectively activatable to activate the sound system.

BRIEF DESCRIPTION OF THE DRAWINGS

These and other examples of the present disclosure will now be described with reference to the following drawings, in which:

FIG. 1b is an expanded perspective view of a support member of the sound generating apparatus of FIG. 1a;

FIG. 7b is a perspective view of the support of FIG. 7a;

FIG. 8b is a top view of the signalling apparatus of FIG. 8a;

FIG. 9b is a top view of the signalling apparatus of FIG. 9a.

DETAILED DESCRIPTION OF THE DRAWINGS

Figure 1A:
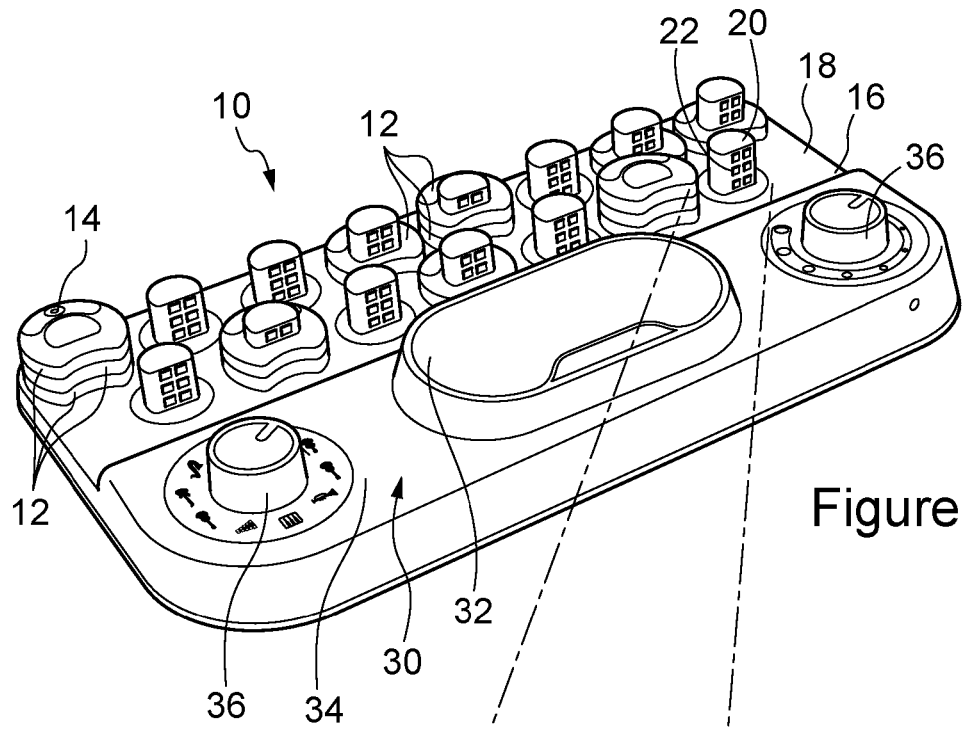
FIG. 1a is a perspective view of a sound generating apparatus according to an example of the present disclosure.

FIGS. 1a to 9b illustrate a signal generating apparatus, which in this example is in the form of a sound generating apparatus 10 (i.e. a sound system). The sound generating apparatus 10 includes a plurality of signalling apparatus 12. The signalling apparatus 12 is referred to by the applicant as a "bop", but in the present example may be considered to be in the form of an identifier for identifying a parameter, such as a note, to the signal generating apparatus 10. The operation of the signal generating apparatus 10 to generate a signal dependent on the parameter may be considered to be activation of the signalling apparatus 12. It will be appreciated that the signal generation apparatus may directly generate a sound itself dependent on the parameter and/or may signal another device to generate the sound. The former situation is described below for ease of explanation, but it will be appreciated that transmission of a signal dependent on the parameter to another device to generate the actual sound may additionally or alternatively be used.

The sound generating apparatus 10 and the signalling apparatus 12 may be considered to be an assembly. The sound generating apparatus 10 can be activated to cause a certain note (e.g. "pitch") to be produced by the sound generating apparatus 10. In this example each signalling apparatus 12 includes a pitch indicator for indicating the note or pitch to be generated by the sound generating apparatus 10; the pitch indicator of the present example takes the form of a visual indicator, which in this example takes the form of inclusion of colour on an outer surface of each signalling apparatus 12. In the present example, each signalling apparatus 12 includes a colour indicative of the note or pitch in addition to indicia 14 displaying the note or pitch (e.g. in this example the notes A, B, C, D, E, F, G and/or sharps (e.g. "#") and/or flats (e.g. "b") of said notes) of an individual signalling apparatus 12. It should be appreciated that in some examples, each signalling apparatus 12 could include a pitch indicator on one or more sides of the signalling apparatus 12.

The drawings as filed which accompany this disclosure are in colour and clearly indicate that each signalling apparatus 12 may have a different colour. However, for the purposes of clarity once the drawings are converted to monochrome, it will be appreciated that the signalling apparatus 12 have a different colour for each indicia 14 (e.g. the signalling apparatus 12 having a C #indicia 14 has a different colour (e.g. light blue) to the signalling apparatus 12 having a D #indicia 14 (e.g. dark blue) and these colours may be represented by a different tone (or shade) in the formal drawings accompanying this disclosure). Of course, any appropriate colour system could be used to represent different notes or pitch. In some examples, predetermined colours of a certain order could be selected and organised according to the order of notes or pitch in an octave (e.g. in some examples the note "A" could be coloured red and the note "G" could be colour violet, and the notes in between "A" and "G" could be organised according to the different colours of the rainbow for example). In some examples, there may be a visual indicator for indicating which octave a note corresponds to, for example, a number or other marking for specifying which octave the note belongs to. In some examples, a certain colour could be assigned to a certain note or pitch, and different shades of said colour could correspond to a semi-tone shift (e.g. a flat or a sharp) in said note or pitch. Of course, any other predetermined set of colours could be provided in any appropriate order or configuration for indicating a predetermined set of notes or pitches. As described in more detail below, the shape of the signalling apparatus 12 may be used to indicate a certain note or pitch, or octave.

The sound generating apparatus 10 includes a support 16 for supporting the signalling apparatus 12, which in this example includes a support surface 18 and a support member 20 (which may also be referred to as a "tower" or "peg"). The support members 20 are configured to support and directly electrically connect to a plurality of the signalling apparatus 12, as will be described in more detail later. A circuit is disposed in, within or on the support member 20. The circuit is not fully illustrated (but is still partially visible) in FIG. 1a, and is described herein. The circuit includes electrical contacts on a PCB (printed circuit board) 22.

It will be appreciated that in the example shown in FIG. 1a, the electrical contacts of each support member 20 could be arranged to face in other directions.

Figure 1B:
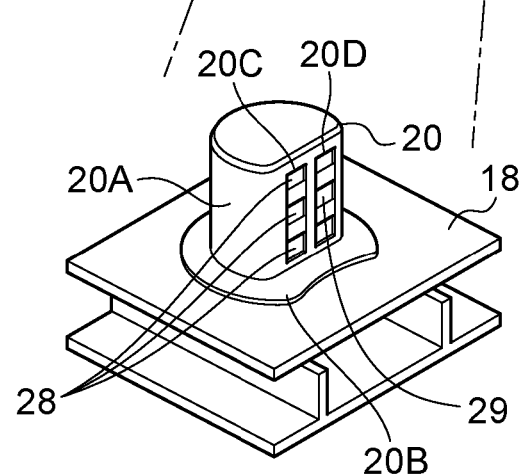

Turning now to FIG. 1b, there is shown an expanded view of one of the support members 20, the PCB 22, and part of the support surface 18. The circuit includes a plurality of communication paths for providing communication between a plurality (in this example three) of the signalling apparatus 12 and the sound generating apparatus 10. In the present example the communication paths each include at least one electrical contact 28 for electrically connecting the signalling apparatus 12 to the sound generating apparatus 10. In this example, the support member 20 includes three electrical contacts 28 (which may each be referred to as an electrical "output" or "output conductor") which are electrically isolated from each other within the support member 20. The support member 20 also includes a plurality (in this case three) other electrical contacts 29 (which may be referred to as an electrical "input" or "input conductor") that correspond to corresponding outputs. More particularly, the electrical contacts 28, 29 are on the PCB 22 housed within the support member 20 but are exposed on an external surface of the support member 20. The electrical contacts 28, 29 of PCB 22 may be considered to be electrical contacts associated with the processor 30. The electrical contacts 28, 29 are positioned facing away from the direction a user would be facing during normal use of the sound system 10.

The support member 20 has a body 20A in the shape of a truncated cylinder with the cut off plane (or flat portion) made perpendicular to its base. As shown in FIG. 1a, this shape is matched to the signalling apparatus 12 such that the signalling apparatus 12 may only be placed on the support member 20 in a particular orientation. In this example, the signalling apparatus 12 are generally in the form of a closed horseshoe shape, annular ring or "donut" defining a hole through which the body 20A of the support member can pass in order to mount the signalling apparatus 12 on the support member 20. However, part of the hole is flatted to correspond to the cut off plane or flat portion of the body 20A of the support member 20. In this way, the signalling apparatus 12 is also correspondingly configured (shaped) such that the signalling apparatus 12 is attachable to the support member 20 at the particular orientation. This means that the signalling apparatus 12 is always positioned correctly for the electrical contacts 28, 29. This makes it easier for a child to understand where the bops should be positioned. Whilst a particularly beneficial mutual shape arrangement of the signalling apparatus 12 and support member 20 is described above, it will be appreciated that other arrangement for mounting and/or ensuring a particular relative orientation of the signalling apparatus 12 and support member 20 may be used.

Extending outwardly from the body 20A of the support member 20 is a rim 20B, which is at least partially in the same plane as the support surface 18. The rim 20B in FIG. 1a is circular but is shown in FIG. 1b as shaped similar to the signalling apparatus 12. However, this difference in shape is just exemplary and does not substantially affect the function of the sound generating apparatus 10. It will be appreciated that in other examples, the rim 20B may take any suitable shape.

The flat portion of the support member 20 comprises six recesses, a vertical column of three first recesses 20C and an adjacent vertical column of three second recesses 20D, to allow access to the electrical contacts 28, 29. The column of electrical contacts 29 in the second recesses 20C is the voltage supply, the other column of electrical contacts 28 transmits the voltage value read to a chip with each value being transmitted individually. Although there are three second recesses 20D to allow access to the electrical contact 29, the electrical contact 29 is a single electrical contact (as shown in more detail in FIG. 5a), i.e. there is not the electrical isolation in the same way as in the case of the three electrical contacts 28. These recesses 20C, 20D also allow secure attachment of the signalling apparatus 12 as will be explained in more detail later. In other examples, it will be appreciated that there may be more or fewer electrical contacts and more or fewer recesses. In other examples, there may be electrically isolated electrical contacts 29 in each of the respective second recesses 20D. Indeed, in other examples, the contact may not be recessed but may be flush with the surface of the body 20A of the support member 20. In other examples, a single common voltage supply contact 28 may be provided. As such, whilst the above arrangement may be particularly beneficial, the present disclosure is not limited to this.

As explained further herein, when a signalling apparatus 12 is attached via the recesses 20C, 20D, the signalling apparatus 12 may be configured to provide an electrical connection between the input electrical contact 29 in the second recess 20D and at least one of the output electrical contacts 28 in the first recess 20C. In some examples, the signalling apparatus 12 may close (complete) an electrical circuit so that the signalling apparatus 12 is in electrical communication with the sound generating apparatus 10. It will be appreciated that any other appropriate electrical arrangement may be provided for causing a signal to be conveyed between the signalling apparatus 12 and the sound generating apparatus 10.

Referring to FIG. 1a once more, the sound generating apparatus 10 includes a processor 30, which in this example is in the form of a sound processor 30 including circuitry for sending an electrical signal to a sound generator, which in this example is in the form of a speaker 32. The processor 30 may be configured for sending a signal to at least one of a: processor (e.g. a further processor such as a signal processor), a memory and a database. The sound processor 30 and speaker 32 are housed by a housing 34. Although, in this example, the sound generating apparatus comprises the speaker 32, it will be appreciated that the processor 30 may be additionally or alternatively configured to signal a remote or otherwise separate device to generate the sound, e.g. via a wired or wireless connection, such as via a Bluetooth®, ZigBee, wi-fi or other suitable connection.

The housing 34 includes a plurality of actuators 36 disposed in an outer surface of the housing 34 for controlling the sound processor 30. For example, the actuators 36 may take the form of a sensor, button, switch, variable resistor, or the like for actuating a function of the sound processor 30. Such functions may include, but not be limited to, changing an acoustic parameter such as volume, tone, pitch, octave, timbre, sound-synthesizing properties such as for producing different sounds according to different audio, sonic or acoustic systems such as an instrument (e.g. musical instrument), game or toy, or the like. The housing 34 could be separate from or integral with the support surface 18. In the present example the housing 34 is disposed adjacent the support surface 18 and includes electrical connections therebetween for providing the communication paths between the signalling apparatus 12 and the sound processor. It will be appreciated that any appropriate arrangement of sound generating apparatus 10 may be provided, as will be described herein.

Figure 2:
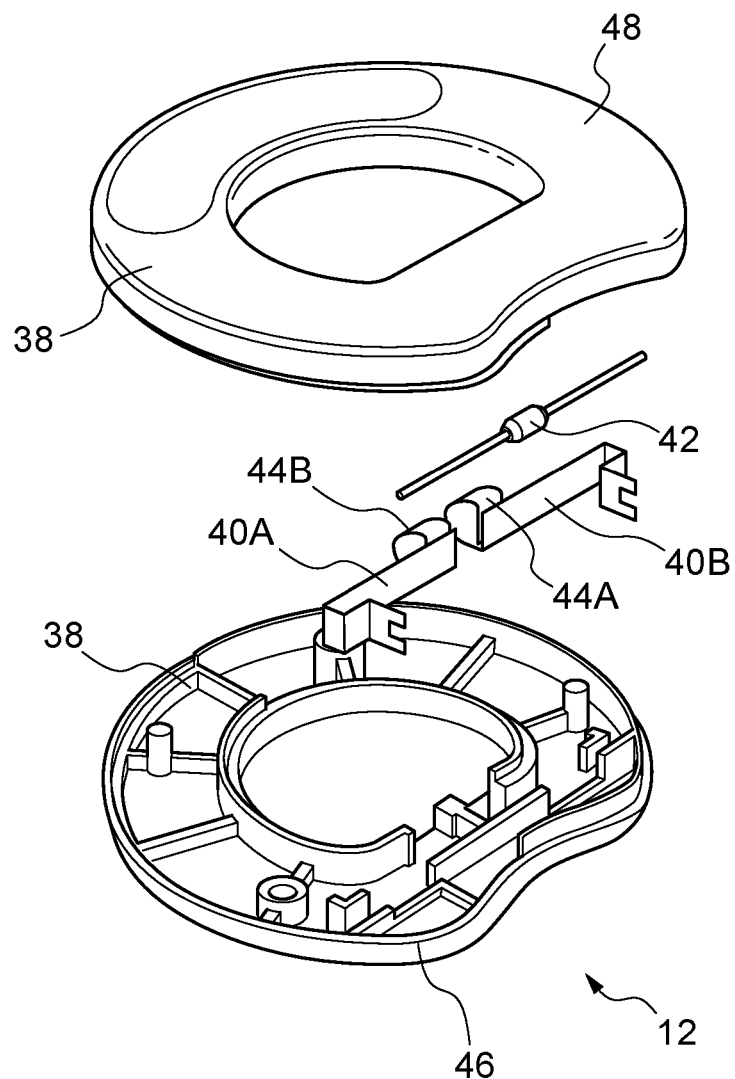
FIG. 2 is an exploded perspective view of a signalling apparatus according to an example of the present disclosure.

Turning now to FIG. 2 there is illustrated an exploded perspective view of the signalling apparatus 12. The signalling apparatus 12 includes a body 38 for housing a communication path, which in this example is in the form of a first conductor 40A and a second conductor 40B which are connected by a resistor 42 (i.e. an identifier). There are two electrical contacts 44A, 44B which are connected to the ends of the conductors 40A, 40B opposite to the ends connected to the resister 42. Having only one resistor 42 and only two electrical contacts in each signalling apparatus 12 means a more simple design and a reduction in cost (e.g. manufacturing and assembly). The two electrical contacts are 44A, 44B are for electrical connection to the electrical contacts 28, 29 in the support member 20. Each of the electrical contacts 44A, 44B of the signalling apparatus 12 are connectable directly to the respective electrical contacts 28, 29 associated with the processor 30.

The electrical contacts 44A, 44B of the signalling apparatus 12 are also shaped to fit at least partially in the recesses 20C, 20D of the support member 20. The electrical contacts 44A, 44B of the signalling apparatus 12 are flexible and resilient such that when they are pressed into the recesses 20C, 20D, they provide a force to hold the signalling apparatus 12 and the support member 20 together to create a relatively strong connection. Thus, in this case, the signalling apparatus 12 may be considered to be physically attached to the support member 20. The electrical contacts 44A, 44B may be considered to attach the signalling apparatus to the support member 20. The signalling apparatus 12 can be removed from the support member 20 (e.g. by pulling the signalling apparatus 12 off the support member 20). Thus, the signalling apparatus may be considered to be selectively attachable to the support 16 (i.e. the support member 20). The above configuration of the electrical contacts 44A, 44B may be simpler and easier to manufacture (and assemble). As detailed above, the body 38 is in the form of an approximate closed horseshoe shape with a hole in a central portion. That is, the body 38 is generally circular with a section of the inner circumference being straight rather than circular and a corresponding section of the external circumference of the body having an indentation towards the centre of the body 38. The body 38 includes a lower body part 46 (a first body part) and an upper body part 48 (a second body part). The lower body part 46 and the upper body part 48 are substantially the same. This saves cost as only one design and/or tool needs to be used for manufacturing the lower body part 46 and the upper body part 48. It will be appreciated that the signalling apparatus 12 is shaped to fit around the support member 20, such that the support member 20 passes through the hole in the signalling apparatus 12 when the signalling apparatus 12 is placed on the support 16. It will be appreciated that the signalling apparatus 12 can be placed on the support member 20 with either the lower body part 46 facing towards the support surface 18 or the upper body part 48 facing towards the support surface 18. This means that either of the two electrical contacts 44A, 44B of the signalling apparatus 12 may be connected to either of the electrical contacts 28, 29 of the support member 20 depending on the particular orientation of the signalling apparatus 12 with respect to the support member 20 and the support surface 18. Thus, the signalling apparatus 12 can be placed either way up which makes it much easier for a young child to understand.

Figure 3:
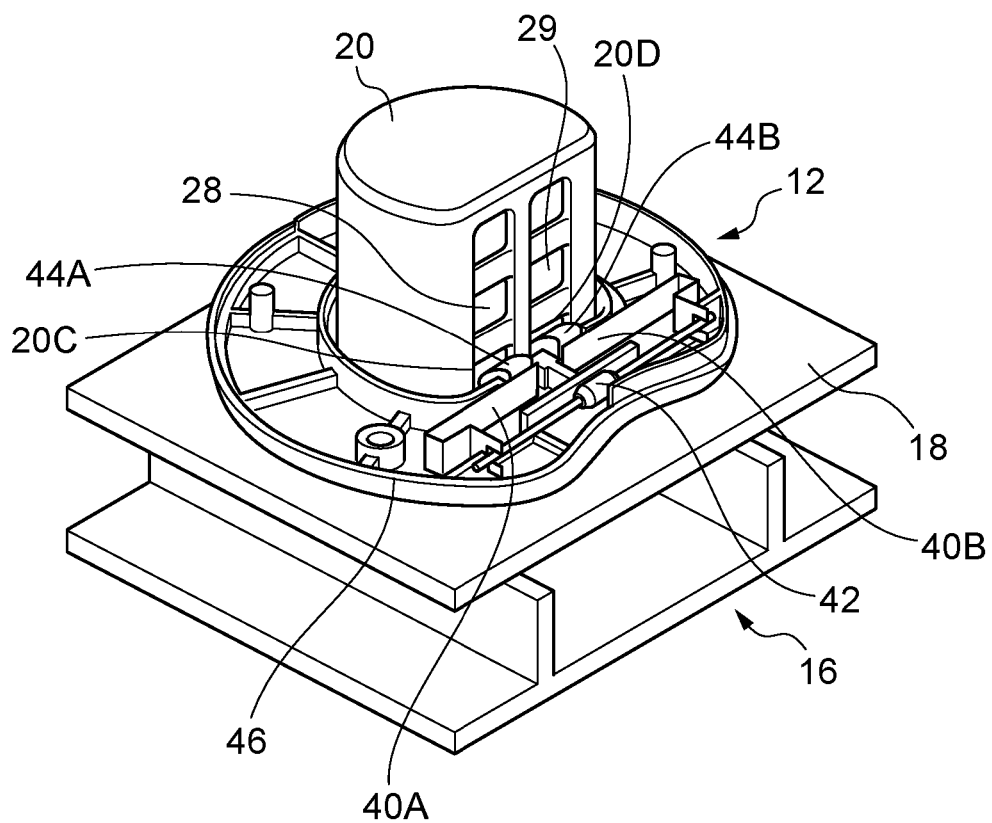
FIG. 3 is a perspective view of a support member and a signalling apparatus according to an example of the present disclosure.

FIG. 3 shows the lower body part 46 of the signalling apparatus 12 in position on the support 16 and being supported by the support member 20. The upper body part 48 of the signalling apparatus 12 is not shown for illustrative purposes but, in practice, the upper body part 48 would also be in position on the support 16. FIG. 3 illustrates how the electrical contacts 44A, 44B of the signalling apparatus 12 connect to the electrical contacts 28, 29 of the PCB 22. Furthermore, the electrical contacts 44A, 44B are shown located in the recesses 20C, 20D which provides the attachment between the signalling apparatus 12 and the support member 20.

As shown in FIG. 1a, a further signalling apparatus 12 may be stacked on top of the signalling apparatus 12. In this case, the electrical contacts 44A, 44B of the further signalling apparatus 12 will be located in the recesses 20C, 20D above the recesses 20C, 20D that make the attachment to the lower signalling apparatus 12. Therefore, the electrical contact 44A of the further signalling apparatus 12 will connect to the electrical contact 28 of the PCB 22 above the electrical contact 28 that the lower signalling apparatus 12 is connected to. Likewise the electrical contact 44B of the further signalling apparatus 12 will connect to portion of the electrical contact 29 of the PCB 22 that is accessible through the recess 20D above the recess 20D for the lower signalling apparatus.

It will be appreciated that only a maximum of three signalling apparatus 12 may be stacked using the support member 20. This means that the stack may be limited, i.e. the number of signalling apparatus 12 that may be stacked upon each other is limited. That is, the support 16 (i.e. the support member 20) and/or the signalling apparatus 12 is configured such that a limited number of signalling apparatus 12 are stackable on the support 16. It is now very clear where the signalling apparatus 12 must be placed which is helpful for a child. In other examples, other numbers of signalling apparatus 12 may be stacked depending on the configuration of the support member 20.

In systems without this feature, the configuration of a signal generating apparatus could allow a limited number of resistors to be identified depending on the number of connections. However, a user could still physically stack an unlimited number of signalling apparatus (bops) one on top of each other but only a limited number of the bops were played. For example, a user may stack five bops but only three bops would be played. The child may be unaware of this limitation and this may cause confusion and may misinform them of what the combination should actually sound like.

The first and second conductors 40A, 40B of the present example are configured to electrically connect one of the electrical contacts 28 of the support member 20 and the electrical contact 29 of the support member 20. The communication path, which in this example is in the form of the first and second conductors 40A, 40B, may be arranged for providing a conducting path between the identifier (resistor 42) of the signalling apparatus 12 and at least one electrical contact (e.g. electrical contact 28 of the support member 20) associated with the processor 30.

The resistor 42 of the signalling apparatus 12 comprises a unique parameter value for identifying a sound property, an audio, sonic or acoustic property associated with the signalling apparatus 12. The processor 30 determines the electrical parameter value associated with the signalling apparatus 12 based on the parameter value for identifying a sound property associated with the signalling apparatus 12, and uses the determined electrical parameter value to identify the sound property. In other examples, the sound property may be considered to be an audio, sonic or acoustic property associated with the signalling apparatus 12.

In other examples, the identifier (e.g. the resistor 42) may comprise any electrical component capable of providing a distinguishable electrical parameter, for example, a resistor, a capacitor, an inductor, or the like. The electrical parameter may comprise at least one of: voltage, current, modulation such as current and/or voltage modulation, impedance, or other electrical parameter.

Once the signalling apparatus 12 is attached to the support member 20 (i.e. the electrical contacts 40A, 40B of the signalling apparatus 12 are attached to the electrical contacts 28, 29 of the PCB 22 of the support 20), then the resistor 42 is in electrical communication with the processor 30 through the communication path. This means that the parameter value of the resistor 42 may be communicated to the processor 30. In this example, whenever the signalling apparatus 12 is attached to the support member 20 then the processor 30 may read the value of the resistor 42. The resistor 42 values are read as soon as the signalling apparatus 12 is/are attached to the support member 20 and transmitted to the PCB 22 and stored and/or send further onwards.

The PCB 22 in the support member 20 is always attached to a control board (not shown) associated with the processor 30. That is, the support 16 and/or support member 20 is configured such that the PCB 22 is continuously electrically connected to the processor 30. Thus, the value of the note is always readable. This means the control board can be scanned and the notes can be played as required (e.g. automatically). This also helps with identifying the notes as the notes are read very early and stored ready for activation. However, the PCB 22 may alternatively be selectively connectable to the control board, e.g. during activation or another operation of the sound generating apparatus 10. Connection to the control board may be through wired connections or fixed and flexible bent metal connections.

Each of the signalling apparatus 12 may be considered to have an independent communication path between their respective resistor 42 and the processor 30. That is, there is an independent communication path to communicate the parameter value from each of the signalling apparatus 12 to the processor 30. In other words, a communication path configured to communicate the parameter value from the signalling apparatus 12 to the processor 30 is independent of a communication path configured to communicate the parameter value from a further signalling apparatus 12 to the processor 30. The signalling apparatus 12 and/or the support (e.g. the support member 20) may be configured such that there are independent communication paths from each signalling apparatus 12 to the processor 30.

Figure 4:
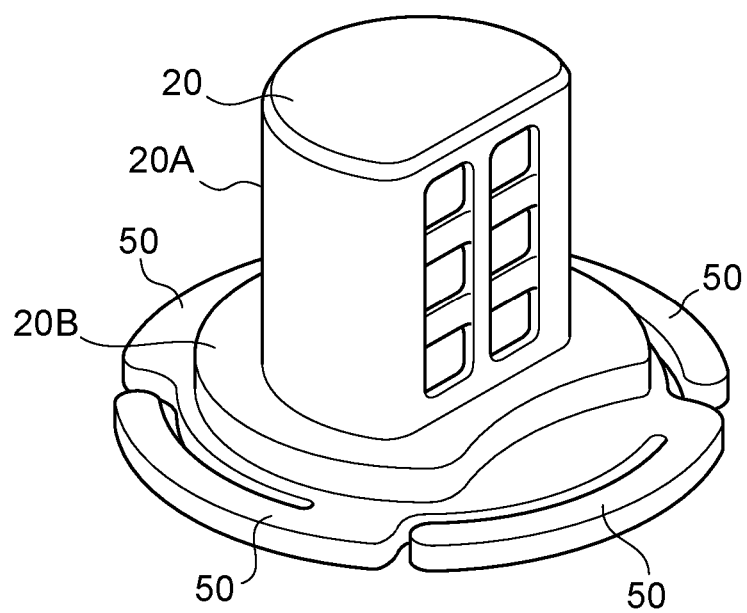
FIG. 4 is a perspective view of a support member of a sound generating apparatus according to an example of the present disclosure.

FIG. 4 shows the support member 20 without the support surface 18. It is illustrated that the rim 20B of the support member 20 extends downwards before extending further outward to form four springs 50. The support member 20 may be considered to flex vertically. These four flexible and resilient springs 50 allow the support member 20 to be pressed downwards towards the support 16. In other words, the support member 20 may be actuated or moved relative to the support surface 18 by providing a biasing force on the top of the body 20A of the support member 20, e.g. when the top of the body 20A is pushed by a user. The user (e.g. a child) can press the support member 20 to activate the sound generating apparatus 10. When the biasing force is removed, the four springs 50 will provide the restoring force to move the support member 20 back to its starting position. The PCB 22 located within the support member 20 is physically attached to the support member 20 and thus also moves with the support member 20. It will be appreciated that when the signalling apparatus 12 is/are stacked on the support member 20, then when the support member 20 is moved relative to the support surface 18, the signalling apparatus 12 will also move in the same manner. Thus, it may be considered that the support member 20 and the signalling apparatus 12 move in tandem. This is because the signalling apparatus is/are physically attached to the support member 20 as described. In other examples, the restoring force may be provided by any suitable biasing mechanism, such as a coiled spring etc. Indeed, other forms of actuatable support members 20 are possible and could be used in the system of the present disclosure.

Figure 5A:
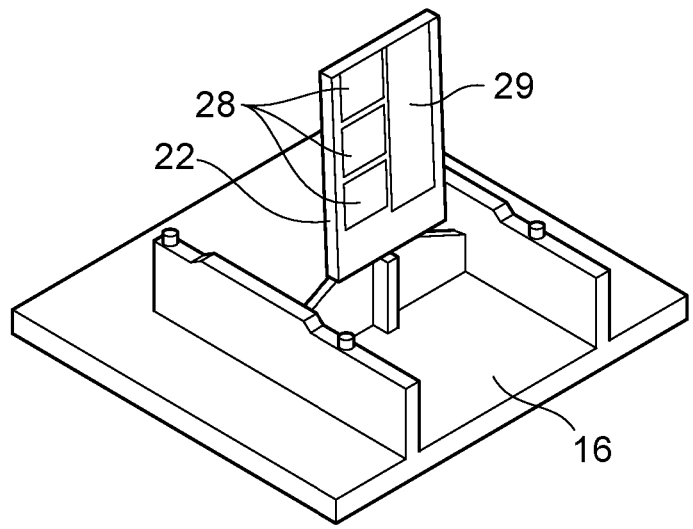
FIG. 5a is a front perspective view of part of a support of a sound generating apparatus according to an example of the present disclosure.
Figure 5B:
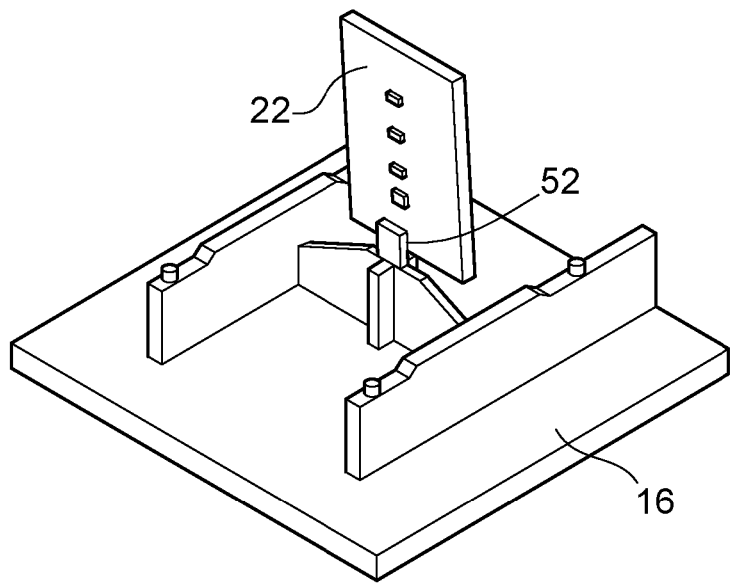
FIG. 5b is a rear perspective view of part of a support of a sound generating apparatus according to an example of the present disclosure.

FIGS. 5a and 5b show the PCB 22 and part of the support 16. The PCB 22 is one sided. The electrical contacts 28, 29 and the electrical isolation between the electrical contacts 28 are shown more clearly on the PCB 22.

Referring to FIG. 5b, there is a button 52 on the support 16. The button 52 is configured to be pressed by the PCB 22 when it is pushed downwards towards the support 16, e.g. by the user. When the support member 20 and/or the signalling apparatus 12 are pushed downwards, which in turn pushes down the PCB 22, the button 52 will be pressed to activate the sound generating apparatus (sound system) as explained in more detail later. In other examples, the support member and/or the signalling apparatus may move away from the support to complete an electrical circuit associated with the processor in order to activate the sound generating apparatus 10. More generally, the support member and/or the signalling apparatus may move relative to the support to complete the electrical circuit associated with the processor in order to activate the sound generating apparatus 10.

As shown in FIG. 1a, all the support members 20 are located at the same level. That is, they are all positioned at the same level with respect to the support surface 18. In addition, the support members 20 are all the same height. This means that the top of the support members 20 are all at the same height above the support surface 18. This provides the advantage that they are easier to play. It will be appreciated that in other examples, the support members 20 may be at different heights.

Figure 6A:
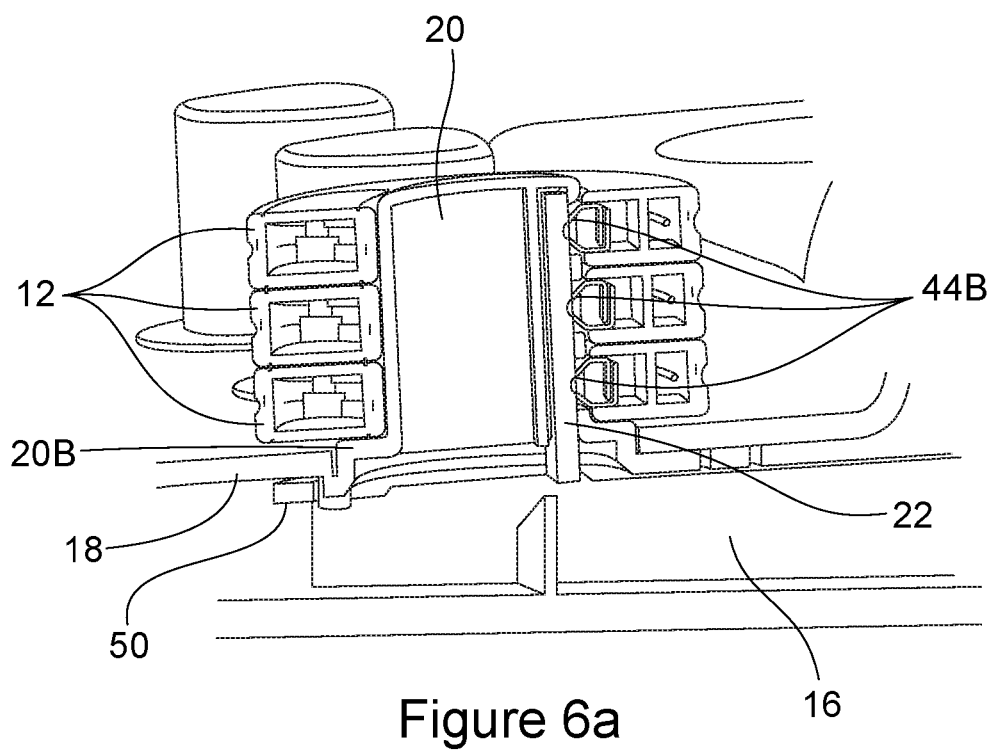
FIG. 6a is a sectional view of a support member and a signalling apparatus according to an example of the present disclosure.

FIG. 6a shows a sectional view taken vertically through three signalling apparatus 12 located on the support 16 and supported by the support member 20. The connections between each of electrical contacts 44B of each of the stacked signalling apparatus 12 and electrical contact 29 of the PCB 22 are shown. In this figure, the support member 20 has not been pushed downwards. It can be seen that the lowermost of the signalling apparatus 12 rests on the rim 20B of the support member 20 such that there is a gap between the face of the lower body part 46 of the signalling apparatus 12 and the support surface 18. This allows the support member 20 and the signalling apparatus 12 to move towards the support 16 in order for the button 52 to be pressed.

Figure 6B:
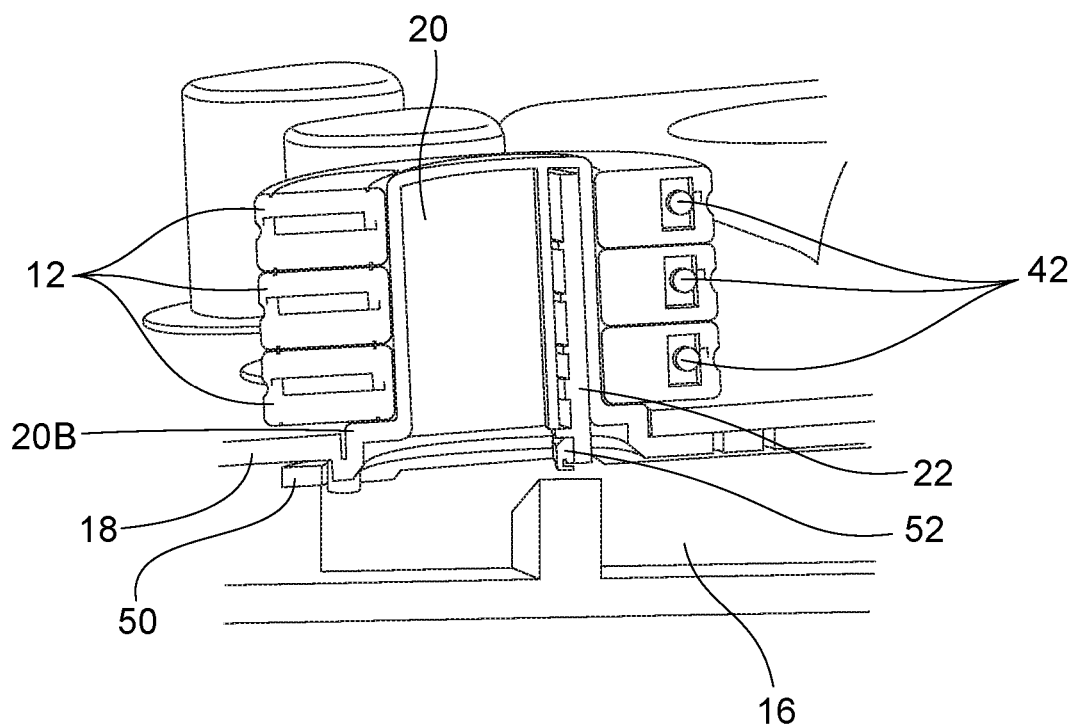
FIG. 6b is a sectional view of a support member and a signalling apparatus according to an example of the present disclosure.

FIG. 6b shows another sectional view taken through a different vertical slice of the sound generating apparatus 10. The three signalling apparatus 12 located on the support 16 and supported by the support member 20 are again shown. In this figure, the support member 20 has not been pushed downwards but it can be seen that when the support member 20 is pushed downwards, the button 52 will be pressed.

The button 52 is part of an electrical circuit associated with the processor 30. This is a separate electrical circuit than the one to communicate the parameter value with the processor 30 (i.e. the circuit including the electrical contacts 28, 29 associated with the processor 30 which are located in the support member 20). When the button 52 is pressed a switch is closed (or in other examples opened) such that the electrical circuit is completed and a signal is sent to the processor 30 to indicate the note associated with the one or more signalling apparatus 12 on the support member 20 should be played. This may be considered to be activation of the sound system (the sound generating apparatus 10). The pressing of the support member 20 and/or the pressing of the signalling apparatus 12 presses the button 52 to complete the circuit and this may be considered to be activation of the signalling apparatus 12. Thus, the signalling apparatus 12 may be selectively activatable to active the sound system (the sound generating apparatus 10). The activation of the sound system (the sound generating system 10) may be sending a signal to the processor 30, sending a signal corresponding to the parameter value and/or playing a sound corresponding to the parameter value.

When the support member 20 and/or the signalling apparatus 12 is pressed to push the button 52, it will be appreciated that the electrical contacts 44A, 44B of the signalling apparatus 12 and the electrical contacts 28, 29 of the support member 20 will not move relative to each other. In other words, the signalling apparatus 12 and/or the support member 20 is configured such that the electrical contacts 44A, 44B of the signalling apparatus 12 is substantially fixed with respect to the electrical contacts 28, 29 associated with the processor 30 during activation of the signalling apparatus 12 and/or activation of the support member 20 (which in turn causes activation of the sound generating apparatus).

Furthermore, it will be appreciated that this is also the case for each of the three signalling apparatus 12 stacked on the support 16. That is, the signalling apparatus and/or the support member 20 is configured such that a plurality of electrical contacts 44A, 44B of the plurality of signalling apparatus 12 may be substantially fixed with respect to respective electrical contacts 28, 29 associated with the processor 30 during activation of the signalling apparatus 12 and/or activation of the support member (which in turn causes activation of the signalling generating apparatus).

The electrical connections (i.e. electrical contacts 28, 29 of the support member 20 and the electrical contacts 44A, 44B of the signalling apparatus 12) do not move against each other when the support member and/or the signalling apparatus 12 is/are pressed.

This contrasts with alternative arrangements in which the signalling apparatus are physically placed on a circuit board and the electrical contacts of the signalling apparatus are connected to the electrical connections of the circuit board. However, for the note to be played the signalling apparatus of the alternative arrangement have to be pressed against a button. This means that the signalling apparatus of the alternative arrangement need to travel and the signalling apparatus of the alternative arrangement move relative to the circuit board. Crucially the electrical connections in the signalling apparatus in this alternative arrangement move relative to the electrical connections on the circuit board. In this case, the connections of the alternative arrangement would move against each other creating an inaccuracy in the resistor reading. In the present invention, this is no longer the case. This has the advantage of an increase in accuracy of resistor reading.

At least one feature of any of the examples of the present disclosure may be modified, adapted or varied in any appropriate way and/or combined with at least one other feature of any of the examples of the present disclosure in any appropriate way. Various possible modifications, adaptations, variations and combinations are described below.

In some examples, the pitch indicator may be in the form of a pattern or any non-colour based visual indicator on an outer surface of the signalling apparatus 12 which may or may not include a visual indicator in the form of a colour as described herein. The non-colour based visual indicator may assist colour blind individuals in using the signal generating apparatus of this disclosure. In some examples, the pitch indicator may be in the form of a physical indicator on an outer surface of the signalling apparatus 12 which may or may not include any of the examples of visual indicators described herein. An example of a physical indicator includes a protrusion, such as a code e.g. Braille, extending from the outer surface of the signalling apparatus 12. The physical indicator may assist visually-impaired individuals in using the signal generating apparatus of this disclosure. In some examples, any combination of visual and physical indicators may be included in the signalling apparatus 12. For example, the signalling apparatus 12 could include at least one of: a colour-based visual indicator, a non-colour based visual indicator, a physical indicator, and the like. The signalling apparatus 12 may therefore be suitable for use by any individual, irrespective of any visual impairment, and as such may be regarded as a more inclusive and accessible to a wider range of individuals.

Some of the signalling apparatus 12 of the examples described herein includes indicia 14. However, in some examples there are only 12 notes but if there are more than 12 notes, the octave of the notes may need to be distinguished by another mark or indicator.

In some examples, magnetic elements may be used for attracting adjacent components together. For example, the support surface 18 and/or the signalling apparatus 12 may include a magnetic element which attracts the components together, for example, in a stack and/or on the support surface 18. Any appropriate arrangement of magnetic elements may be used.

The signalling apparatus 12 and/or support surface 18 may be made from any appropriate material or materials. For example, any component may be constructed from a plastics material such as polypropylene, polyethylene, or the like. The material may be relatively suitable for recycling.

In some examples, the signalling apparatus 12 may be activated by a user, for example, by pressing on the signalling apparatus 12 such that the button 52 (switch) is closed to complete a circuit, and thereby communicate with the sound processor 30 (e.g. by allowing current to flow through the completed circuit). In some examples, the signalling apparatus 12 may be activated by a user such that the switch is closed to complete a circuit, but the sound processor 30 does not cause a sound (or signal) to be produced until a required time. For example, a user could arrange a number of the signalling apparatus 12 in a sequence (e.g. from left to right, or the like) on the support surface 16 and then at least one of the signalling apparatus 12 is activated (e.g. in some examples a different mechanism may be provided so that the switch is maintained in a closed position). Then, a user could activate the signalling apparatus 12 detection/measurement system such that the sound processor 30 scans along the sequence of the signalling apparatus in terms of time, e.g. such that the notes are played from left to right, or the like. This function may be enabled due to the electrical circuit between the resistors 42 and the processor 30 enabling a signal to be sent/received to/from the signalling apparatus 12 by the processor 30 as required (e.g. as part of a scanning or sweeping function).

In some examples a wired connection is utilised for providing the communication path between the signalling apparatus 12 and the processor 30. However in some examples, there may be a wireless connection between the signalling apparatus 12 and the processor 30. For example, the signalling apparatus 12 may include a wireless device configured to communicate the unique parameter value with the processor 30 when activated. For example, the wireless device may comprise a device including at least one of: Wi-Fi, Bluetooth, Near Field Communication (NFC) technology, or indeed any other appropriate wireless technology. The signalling apparatus 12 may be configured to permit a plurality of wireless signals to be communicated. Similarly, the wireless device may be configured to communicate the signal representative of the signalling apparatus 12 that are connected to the support member(s) 20 to an external and/or remote sound generating device that generates the sound based on the signal. For example, the signal may be transmitted via Bluetooth MIDI to a remote or separate device.

In some examples, the wireless connection may comprise a magnetic, optical, radio-frequency and/or electromagnetic signal connection. Providing a wireless connection may be reliable and/or simple to use. Further, the signalling apparatus 12 may be locatable at any appropriate position. In some examples, the support 16 may comprise a power source for powering the signal apparatus, for example, so that the wireless connection may be operated. In some examples, the signalling apparatus 12 may include an energy storage device such as a battery for powering the wireless connection.

Although the present disclosure describes examples of a sound generating apparatus 10 it will be appreciated that the present disclosure may be considered to describe a signal generating apparatus (which in some examples may take the form of the sound generating apparatus 10). As such, the signal generating apparatus may not just be configured to generate a sound directly (e.g. there may not necessarily be a speaker). Alternatively or additionally, the signal generating apparatus may be configured to generate a signal which may be processed further for any appropriate purpose. For example, a signal generated by the signal generating apparatus may be communicated with another processor, hardware, interface, or the like. For example, the hardware may include a computer, laptop, tablet, phablet, phone, wearable device such as a watch, or any other appropriate device, which in some examples may include an interface, for example a screen interface for displaying data or other information. The interface may be interactive, for example a touch screen, or the like.

In an example, it may be possible to assign a function such as a trigger for a sound, sonic or acoustic function (similar to sample pads) to the "identifier" (e.g. the resistance value) in the signalling apparatus 12. For example, the processor 30 may be configurable to define an output in response to detecting the presence of at least one signalling apparatus 12 assigned to the function and/or a user pressing the at least one signalling apparatus 12 to activate or deactivates the function.

In an example, the processor is operable to communicate information to a computing device, for example a PC, tablet device, phone, internet-enabled device, server or the like. For example, the computing device and/or the processor may be configured to send/receive a signal to/from the signalling apparatus. The signal may be used to provide an indication of which signalling apparatus is/are being activated, where they are located (e.g. on the support surface 18), which parameter values (e.g. resistance values) each signalling apparatus 12 has so that the processor and/or computing device may perform a function such as play or record a sound, or activate/deactivate a function of any kind. The connection between the processor and the computing device may be wired (e.g. USB or the like) or wireless (e.g. Bluetooth® or the like). The computing device may run an app, which may, for example, record the signals or sounds provided by the system 10 and may provide functionality to allow for further editing, manipulation, playing or the like. The app may be a custom app or an existing or off the shelf music app, such as Garageband or the like.

Various references to "signalling apparatus" are made throughout the present disclosure. It will be appreciated that the term "signalling apparatus" may be singular or plural, irrespective of whether preceded by a term such as "one or more" or "at least one", or the like.

Figure 7A:
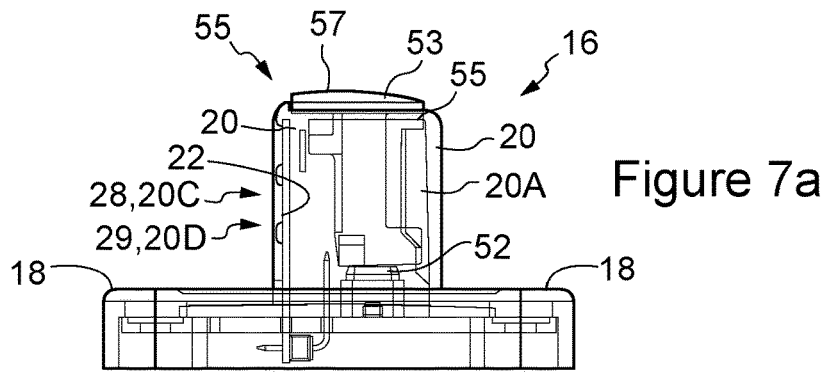
FIG. 7a is a sectional view of a support according to another example of the present disclosure.
Figure 7B:
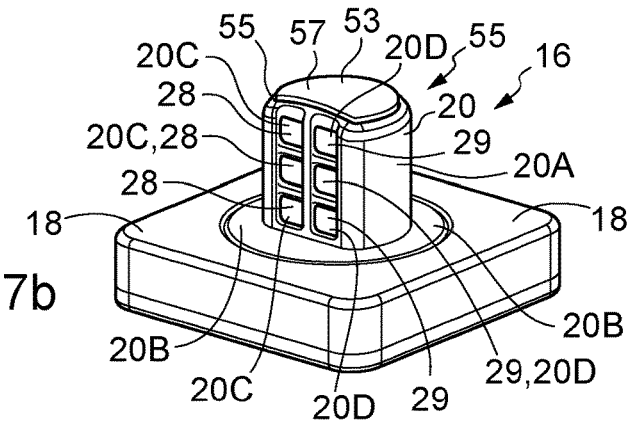

FIGS. 7a and 7b show an alternative example of the support 16 of the present invention. The example illustrated in FIGS. 7a and 7b is substantially the same as the example illustrated in FIGS. 1a to 6b, the main difference being that the support member 20 is configured to remain substantially fixed relative to the support 16 during activation of the sound system, as the support 16 comprises input means 53 operable to complete the electrical circuit associated with the processor in order to activate the sound system. In the example illustrated in FIGS. 7a and 7b, the user input means 53 is a push button, although it will be appreciated that other forms of user input means could be used, such as a button, a switch, or the like.

The user input means is located at an upper region 55 of the support 16 and on a top surface 57 of the support 16.

The user input means 53 is configured to move relative to the support member 20 and the support member 20 is configured to remain fixed relative to the support 16, during activation of the sound system. This improves the stability of the support 16 and the signalling apparatus 12, as the support member 20 and the signalling apparatus 12 are stationary during the activation of the sound system.

Figure 8A:
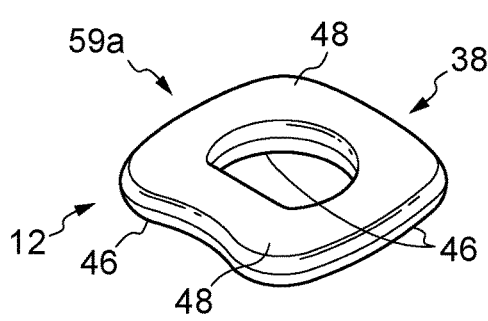
FIG. 8a is a perspective view of a signalling apparatus according to another example of the present disclosure.
Figure 9A:
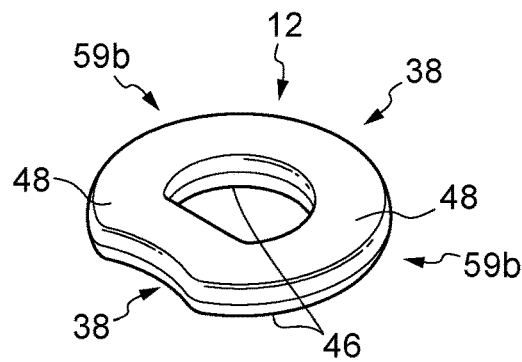
FIG. 9a is a perspective view of a signalling apparatus according to another example of the present disclosure.
Figure 8B:
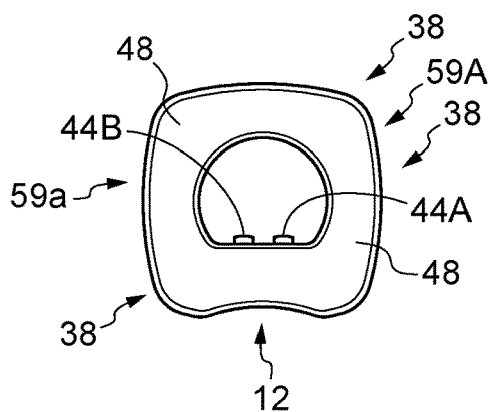
Figure 9B:
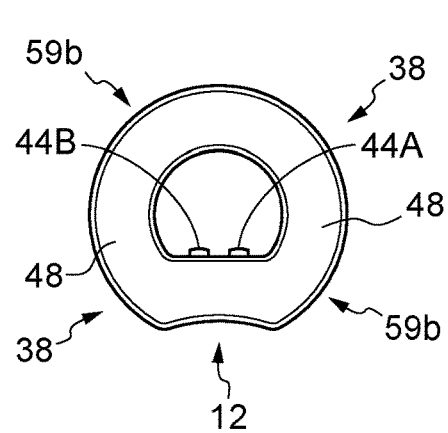

FIGS. 8a to 9b show alternative examples of the signalling apparatus 12. The signalling apparatus 12 shown in FIGS. 8a and 8b, and in FIGS. 9a and 9b, are substantially identical to the signalling apparatus 12 shown in FIGS. 1a to 6b, with the exception that the signalling apparatus 12 comprises a sound property indicator element 59a and 59b corresponding to one or more sound properties. As shown in FIGS. 8a and 8b, the shape of the at least a portion of the signalling apparatus 12 serves to easily differentiate it from the signalling apparatus 12 shown in FIGS. 9a and 9b, which has a different shape. For example, the signalling apparatus 12 shown in FIG. 8a could contain a unique parameter value representing a musical note (e.g. a low C) and the signalling apparatus 12 shown in FIG. 9a could contain a unique parameter value representing a musical note at a higher octave (e.g. a high C). It will be appreciated that other arrangements of indicator elements 59a and 59b are possible. For example, the shape of each of the signalling apparatus 12 could represent a particular octave and a pitch indicator used to indicate the pitch (e.g. a C note).

The invention claimed is:

1. Signalling apparatus for a sound system, the signalling apparatus being configured for communicating with a processor, the signalling apparatus comprising:
an identifier comprising a unique parameter value for identifying a sound property associated with the signalling apparatus; and
an electrical contact configured to electrically connect with an electrical contact associated with the processor to communicate the parameter value with the processor,
wherein the signalling apparatus is configured such that at least one further signalling apparatus is stackable on the signalling apparatus,
wherein the signalling apparatus and further signalling apparatus are configured such that only a limited number of signalling apparatus are stackable,
wherein the signalling apparatus and the further signalling apparatus are configured such that a plurality of electrical contacts of the plurality of signalling apparatus are substantially fixed with respect to respective electrical contacts associated with the processor during activation of the sound system and/or signalling apparatus.

2. The signalling apparatus according to claim 1, wherein a communication path configured to communicate the parameter value from the signalling apparatus to the processor is independent of a communication path configured to communicate the parameter value from a further signalling apparatus to the processor.

3. The signalling apparatus according to claim 1, wherein the electrical contacts of the plurality of signalling apparatus are configured such that the electrical contacts are attachable to a support for supporting the signalling apparatus such that a limited number of signalling apparatus are stackable on the support.

4. The signalling apparatus according to claim 1, wherein the signalling apparatus and the further signalling apparatus are configured such that electrical contacts of each of the signalling apparatus are connectable directly to the electrical contacts associated with the processor.

5. The signalling apparatus according to claim 1, wherein the support and/or signalling apparatus is configured to be selectively activated to complete an electrical circuit associated with the processor in order to activate the sound system.

6. The signalling apparatus according to claim 1, wherein the activation of the sound system and/or the signalling apparatus comprises at least one of: sending a signal to the processor, sending a signal corresponding to the parameter value, playing a sound corresponding to the parameter value.

7. A support operable to provide communication between a plurality of signalling apparatus for a sound system and a processor configured for communicating with the signalling apparatus, each signalling apparatus comprising an identifier comprising a unique parameter value for identifying a sound property associated with the signalling apparatus;
wherein the support comprises an electrical contact associated with the processor, the electrical contact configured to electrically connect with an electrical contact of the signalling apparatus to communicate the parameter value with the processor,
wherein the support is configured such that a limited number of signalling apparatus are stackable on the support,
wherein the support is configured such that a plurality of electrical contacts of the plurality of signalling apparatus is substantially fixed with respect to respective electrical contacts associated with the processor during activation of the sound system and/or the signalling apparatus.

8. The support according to claim 7, wherein the support comprises a support member, the support member being configured such that the signalling apparatus is attachable to the support member such that the signalling apparatus is substantially fixed with respect to the support member.

9. The support according to claim 8, wherein the support member is configured to move relative to the support to complete an electrical circuit associated with the processor in order to activate the sound system.

10. The support according to claim 9, wherein the support member is configured to move towards the support to complete an electrical circuit associated with the processor in order to activate the sound system.

11. The support member according to claim 8, wherein the support member is configured to remain substantially fixed relative to the support during activation of the sound system.

12. The support according to claim 7, wherein the support is configured such that a communication path configured to communicate the parameter value from the signalling apparatus to the processor is independent of a communication path configured to communicate the parameter value from a further signalling apparatus to the processor, the further signalling apparatus being stacked on the signalling apparatus.

13. The support according to claim 7, wherein the support is configured such that the plurality of electrical contacts of the plurality of signalling apparatus are attachable to the support such that a limited number of signalling apparatus are stackable on the support.

14. The support according to claim 7, wherein the support is configured such that electrical contacts of each of the signalling apparatus are connectable directly to the electrical contacts associated with the processor.

15. An assembly comprising:
(i) a support operable to provide communication between a plurality of signalling apparatus for a sound system and a processor configured for communicating with the signalling apparatus, each signalling apparatus comprising an identifier comprising a unique parameter value for identifying a sound property associated with the signalling apparatus;
wherein the support comprises an electrical contact associated with the processor, the electrical contact configured to electrically connect with an electrical contact of the signalling apparatus to communicate the parameter value with the processor,
wherein the support is configured such that a limited number of signalling apparatus are stackable on the support,
wherein the support is configured such that a plurality of electrical contacts of the plurality of signalling apparatus is substantially fixed with respect to respective electrical contacts associated with the processor during activation of the sound system and/or the signalling apparatus; and
(ii) at least one signalling apparatus for the sound system, the signalling apparatus being configured for communicating with the processor, the signalling apparatus comprising:
an identifier comprising a unique parameter value for identifying a sound property associated with the signalling apparatus; and an electrical contact configured to electrically connect with an electrical contact associated with the processor to communicate the parameter value with the processor, wherein the signalling apparatus is configured such that at least one further signalling apparatus is stackable on the signalling apparatus, wherein the signalling apparatus and further signalling apparatus are configured such that only a limited number of signalling apparatus are stackable, wherein the signalling apparatus and the further signalling apparatus are configured such that a plurality of electrical contacts of the plurality of signalling apparatus are substantially fixed with respect to respective electrical contacts associated with the processor during activation of the sound system and/or signalling apparatus.

* * * * *